United States Patent
Hong

(10) Patent No.: US 10,402,033 B2
(45) Date of Patent: Sep. 3, 2019

(54) INPUT SENSOR AND DISPLAY DEVICE INCLUDING THE SAME

(71) Applicant: Samsung Display Co., Ltd., Yongin-si (KR)

(72) Inventor: Won Ki Hong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/603,367

(22) Filed: May 23, 2017

(65) Prior Publication Data

US 2018/0067614 A1 Mar. 8, 2018

(30) Foreign Application Priority Data

Sep. 7, 2016 (KR) .................. 10-2016-0115186

(51) Int. Cl.
| | | |
|---|---|---|
| *G06F 3/045* | (2006.01) | |
| *G06F 3/044* | (2006.01) | |
| *G06F 3/041* | (2006.01) | |

(52) U.S. Cl.
CPC .............. *G06F 3/045* (2013.01); *G06F 3/044* (2013.01); *G06F 3/0416* (2013.01); *G06F 2203/04105* (2013.01)

(58) Field of Classification Search
CPC ........ G06F 3/0418; G06F 3/044; G06F 3/045; G06F 3/0488; G06F 3/0416
See application file for complete search history.

(56) References Cited

U.S. PATENT DOCUMENTS

| | | | |
|---|---|---|---|
| 7,511,702 B2 | 3/2009 | Hotelling | |
| 7,538,760 B2 | 5/2009 | Hotelling et al. | |
| 8,654,095 B1* | 2/2014 | Cho | G06F 3/0412 345/173 |
| 8,654,524 B2 | 2/2014 | Pance et al. | |
| 8,686,952 B2 | 4/2014 | Burrough et al. | |
| 8,787,006 B2 | 7/2014 | Golko et al. | |
| 9,178,509 B2 | 11/2015 | Bernstein | |
| 9,274,660 B2 | 3/2016 | Bernstein et al. | |
| 9,501,195 B1* | 11/2016 | Kim | G02F 1/13338 |
| 9,830,030 B2* | 11/2017 | Chang | G06F 3/044 |
| 9,933,887 B2* | 4/2018 | Choi | G06F 3/0416 |
| 9,941,918 B2* | 4/2018 | Kim | H04B 1/3827 |
| 2001/0020925 A1* | 9/2001 | Hattori | G02F 1/134336 345/87 |
| 2014/0028575 A1 | 1/2014 | Parivar et al. | |
| 2014/0085213 A1 | 3/2014 | Huppi et al. | |
| 2014/0109698 A1 | 4/2014 | Lussey et al. | |
| 2014/0293145 A1 | 10/2014 | Jones et al. | |

(Continued)

FOREIGN PATENT DOCUMENTS

KR 2017047057 * 5/2017 ........... G06F 3/0416

*Primary Examiner* — Ricardo Osorio
(74) *Attorney, Agent, or Firm* — H.C. Park & Associates, PLC

(57) ABSTRACT

An input sensor including a substrate, a first pressure sensor disposed on the substrate, and a sensor controller configured to apply a driving signal to the first pressure sensor and calculate a position and an intensity of a touch by using a first detection signal obtained from the first pressure sensor, in which the sensor controller is configured to not apply the driving signal to at least a portion of the first pressure sensor when the substrate is folded.

15 Claims, 11 Drawing Sheets

(56) References Cited

U.S. PATENT DOCUMENTS

| | | | |
|---|---|---|---|
| 2016/0085336 A1* | 3/2016 | Kim | G06F 3/044 |
| | | | 345/174 |
| 2016/0321969 A1* | 11/2016 | Kambhatla | G09G 3/003 |
| 2017/0045996 A1* | 2/2017 | Ka | G06F 3/0483 |
| 2017/0123460 A1* | 5/2017 | Jung | G06F 1/1652 |
| 2017/0199712 A1* | 7/2017 | Lee | G01B 7/22 |
| 2017/0285837 A1* | 10/2017 | Zeng | G06F 1/1641 |
| 2018/0061307 A1* | 3/2018 | Inoue | G09G 3/2096 |

* cited by examiner

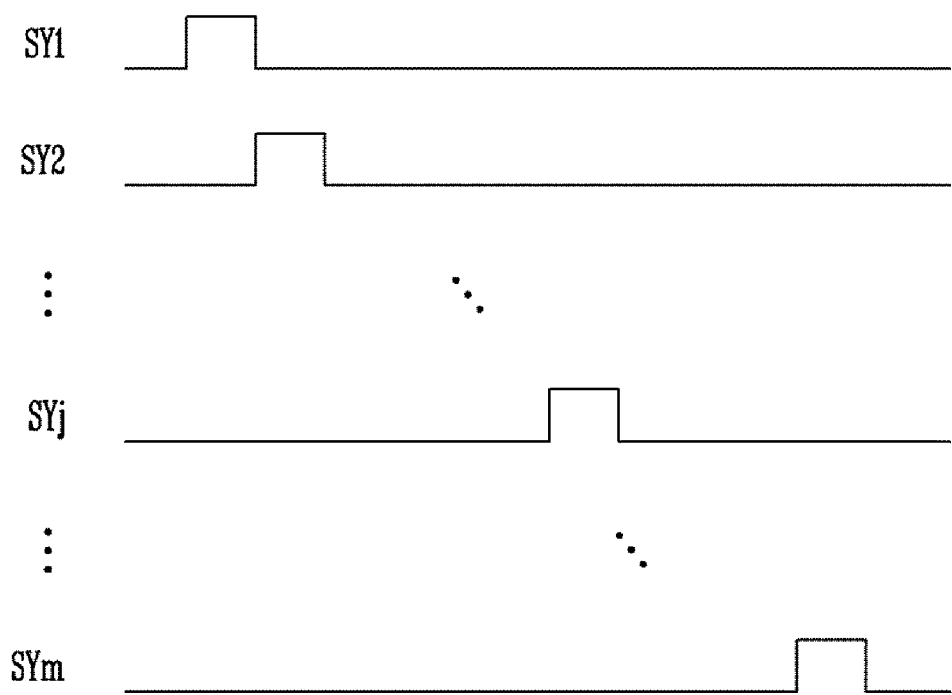

INPUT SENSOR AND DISPLAY DEVICE INCLUDING THE SAME

CROSS-REFERENCE TO RELATED APPLICATION

This application claims priority from and the benefit of Korean Patent Application No. 10-2016-0115186, filed on Sep. 7, 2016, which is hereby incorporated by reference for all purposes as if fully set forth herein.

BACKGROUND

Field

Exemplary embodiments relate to an input sensor, and a display device including the same.

Discussion of the Background

As interests on an information display and demands for use of portable information media increase, research on display devices have been conducted. A display device may include a touch sensor for receiving a touch of a user in addition to its image display function, which may allow a user to use the display device more conveniently.

Recently, a display device may provide various functions to a user by using a pressure from the touch, as well as a touch position.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an input sensor for recognizing a position and intensity of a touch, which may reduce pressure touch recognition errors generated when an input sensor is folded.

Additional aspects will be set forth in the detailed description which follows, and, in part, will be apparent from the disclosure, or may be learned by practice of the inventive concept.

According to an exemplary embodiment, an input sensor includes a substrate, a first pressure sensor disposed on the substrate, and a sensor controller configured to apply a driving signal to the first pressure sensor and calculate a position and an intensity of a touch by using a first detection signal obtained from the first pressure sensor, in which the sensor controller is configured to not apply the driving signal to at least a portion of the first pressure sensor when the substrate is folded.

The sensor controller may be configured to not apply the driving signal to the first pressure sensor disposed in a folding area when the substrate is folded.

The sensor controller may be configured to not apply the driving signal to the entire first pressure sensor when the substrate is folded.

The input sensor may further include a second pressure sensor disposed around the first pressure sensor, and configured to detect a pressure applied to the substrate when the substrate is folded.

The sensor controller may be configured to determine a folding angle of the substrate by using a second detection signal obtained from the second pressure sensor.

The sensor controller may be configured to not apply the driving signal to at least a portion of the first pressure sensor when it is determined that the substrate is folded by at least a first predetermined angle.

The sensor controller may be configured to not apply the driving signal to at least a portion of the first pressure sensor when it is determined that the substrate maintains a folded state for at least a first time period.

The second pressure sensor may be configured to detect a pressure applied to the substrate when the folded substrate is unfolded.

The sensor controller may be configured to apply the driving signal to the entire first pressure sensor when the folded substrate is unfolded.

The sensor controller may be configured to determine whether the substrate is folded by using the first detection signal obtained from the first pressure sensor.

According to an exemplary embodiment, a display device includes an input sensor and a display panel disposed on one surface of the input sensor and configured to display an image of an executed user interface corresponding to the position and the intensity of the input pressure. The input sensor includes a first pressure sensor configured to detect a pressure input to the display device, and a sensor controller configured to apply a driving signal to the first pressure sensor and calculate a position and an intensity of the pressure by using a first detection signal obtained from the first pressure sensor, in which the sensor controller is configured to not apply the driving signal to at least a portion of the first pressure sensor, or the display panel is configured to not execute the user interface, when the display device is folded.

The sensor controller may be configured to not apply the driving signal to the first pressure sensor disposed in a folding area when the display device is folded.

The sensor controller may be configured to not apply the driving signal to the entire first pressure sensor when the display device is folded.

The display device may further include second pressure sensors disposed around the first pressure sensor, and configured to detect a pressure applied to the display device when the display device is folded.

The sensor controller may be configured to determine a folding angle of the display device by using a second detection signal obtained from the second pressure sensors.

The sensor controller may be configured to not apply the driving signal to at least the portion of the first pressure sensor when it is determined that the folding angle is greater than a first angle.

The sensor controller may be configured to not apply the driving signal to at least the portion of the first pressure sensor when it is determined that the display device maintains a folded state for at least a first time period.

The second pressure sensors may be configured to detect a pressure applied to the display device when the folded display device is unfolded.

The sensor controller may be configured to apply the driving signal to the entire first pressure sensor when the folded display device is unfolded.

The sensor controller may be configured to apply the driving signal to the entire first pressure sensor, when the display device is folded such that the user interface is not executed.

The display panel may be configured to not display an image of the user interface corresponding to the first detection signal obtained from the first pressure sensor disposed in a folding area when the display device is folded.

The foregoing general description and the following detailed description are exemplary and explanatory and are intended to provide further explanation of the claimed subject matter

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 5B is a diagram illustrating waveforms of driving signals applied to second electrodes.

DETAILED DESCRIPTION OF THE ILLUSTRATED EMBODIMENTS

Figure 1:
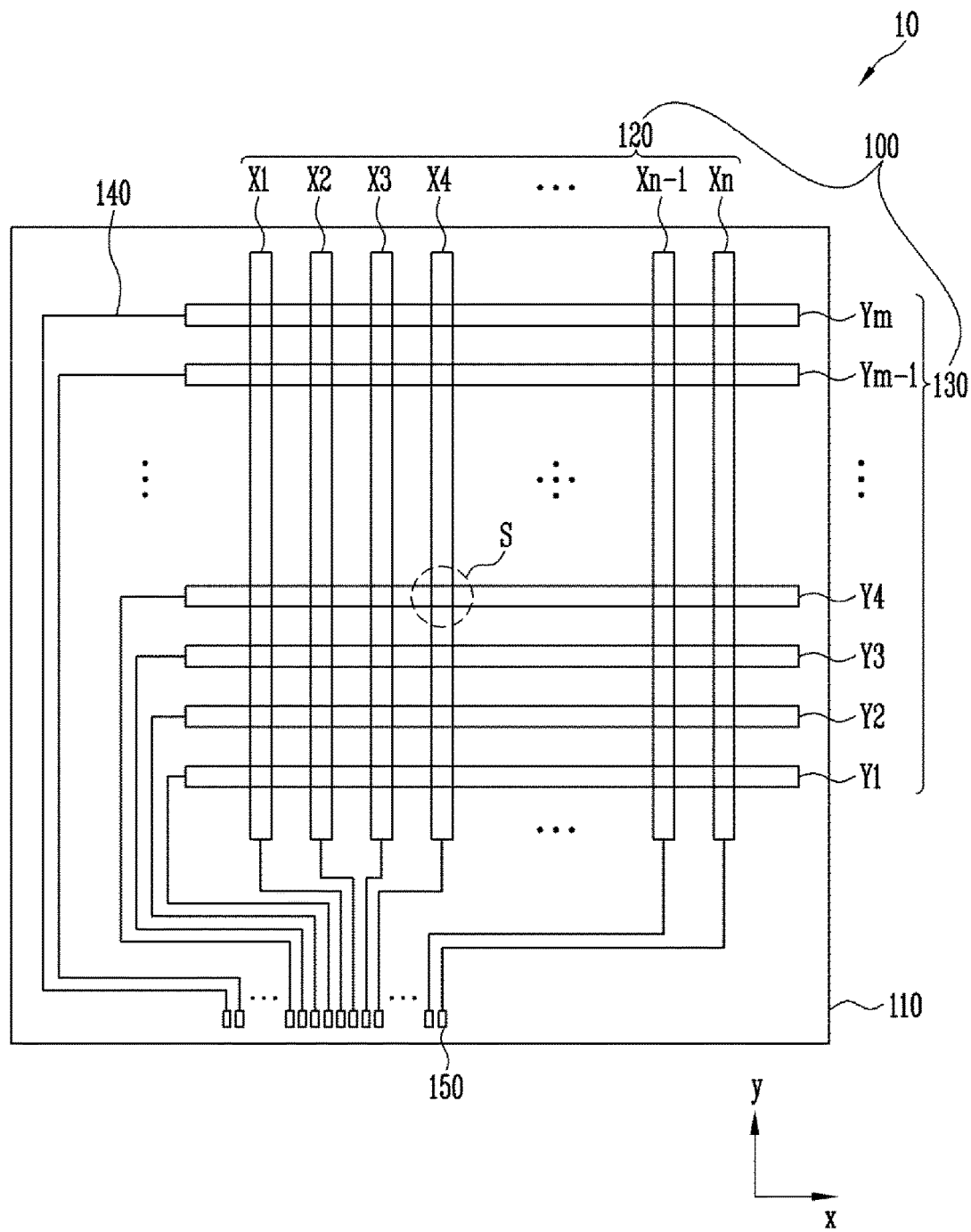
FIG. 1 is a top plan view illustrating an input sensor according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a top plan view illustrating an input sensor according to an exemplary embodiment.

Referring to FIG. 1, an input sensor 10 according to an exemplary embodiment may include a substrate 110 and a first pressure sensor 100 disposed on the substrate 110.

The first pressure sensor 100 may include first electrodes 120 and second electrodes 130. The first electrodes 120 and the second electrodes 130 may include a conductive material, such as a metal or an alloy thereof. The metal may include, for example, gold (Au), silver (Ag), aluminum (Al), molybdenum (Mo), chrome (Cr), titanium (Ti), nickel (Ni), neodymium (Nd), copper (Cu), platinum (Pt), and the like.

According to an exemplary embodiment, the first and second electrodes 120 and 130 may include a transparent conductive material, such as silver nano wire (AgNW), indium tin oxide (ITO), indium zinc oxide (IZO), antimony zinc oxide (AZO), indium tin zinc oxide (ITZO), zinc oxide (ZnC), tin oxide (SnO$_2$), a carbon nano tube, graphene, and the like. The first and second electrodes 120 and 130 may be formed in a single layer or multiple layers.

Elastic members (not illustrated) may be disposed between the first electrodes 120 and the second electrodes 130.

The first electrodes 120 may include n electrodes X1 to Xn sequentially arranged in an x-axis direction, and the second electrodes 130 may include m electrodes Y1 to Ym sequentially arranged in a y-axis direction vertical to the x-axis direction. Herein, n and m are natural numbers greater than 2 or more.

A driving signal for driving the first pressure sensor 100 may be applied to at least one of the first electrodes 120 and the second electrodes 130, and a detection signal corresponding to a variation in capacitance may be obtained from any one of the first electrodes 120 and the second electrodes 130.

The substrate 110 may include an insulating material, such as glass or resin. Further, the substrate 110 may include a material having flexibility so as to be bendable or foldable, and may have a single-layer structure of a multi-layer structure. For example, the substrate 110 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material of the substrate 110 may be variously changed, and may include fiber glass reinforced plastic (FRP), and the like.

Wires 140 may be connected between the first and second electrodes 120 and 130 and pads 150. Further, the wires 140 may be connected with a sensor controller (not illustrated) through the pads 150.

When a touch is input to the input sensor 10, capacitance between the first and second electrodes 120 and 130 may be changed due to the touch such that the sensor controller may detect a position of the touch by using signals output from the first electrodes 120 or the second electrodes 130. Further, the sensor controller may also detect an intensity of the touch by using a variation of the capacitance, which will be described in detail below.

Figure 2:
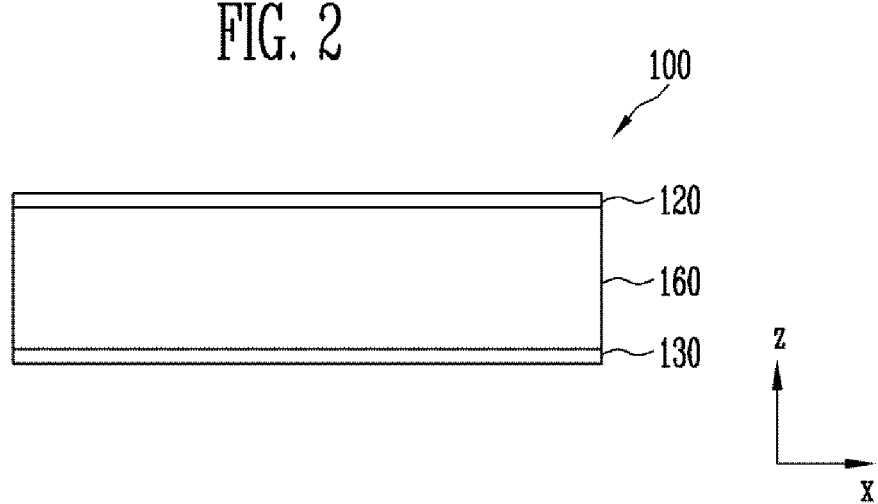
FIG. 2 is a cross-sectional view illustrating a partial area S of a pressure sensor illustrated in FIG. 1.

FIG. 2 is a cross-sectional view illustrating a partial area S of the first pressure sensor illustrated in FIG. 1.

Referring to FIGS. 1 and 2, the first pressure sensor 100 according to an exemplary embodiment may further include an elastic member 160 disposed between the first electrode 120 and the second electrode 130.

The first electrode 120 and the second electrode 130 may be spaced apart from each other. In this case, the first electrode 120 and the second electrode 130 may form a capacitor, and capacitance may be formed between the first electrode 120 and the second electrode 130.

The capacitance between the first electrode 120 and the second electrode 130 may be varied according to a spaced distance between the first electrode 120 and the second electrode 130. For example, when a touch occurs in the input sensor 10, a distance between the first electrode 120 and the second electrode 130 that are disposed on the touched area may be changed, and thus, the capacitance may be changed. Accordingly, the pressure from the touch may be detected by detecting the variation of capacitance from the touch.

FIG. 2 illustrates that the first conductor 120 is disposed at an upper side of the second electrode 130. Alternatively, the first electrode 120 may also be disposed at a lower side of the second electrode 130.

The elastic member 160 may be disposed between the first electrode 120 and the second electrode 130. For example, one surface of the elastic member 160 may contact the first electrode 120, and the other surface of the elastic member 160 may contact the second electrode 130. Further, the elastic member 160 may be entirely formed between the first electrodes 120 and the second electrodes 130, or may be partially disposed in crossing portions of the first electrodes 120 and the second electrodes 130.

The elastic member 160 may relieve impact from the outside, and thus, the elastic member 160 may have elastic force. For example, the elastic member 160 may be deformed by the pressure from the outside, and the elastic member 130 may be restored to an original state when the pressure from the outside is removed by its elastic force. Further, the elastic member 160 may have an insulating property in order to prevent the first electrode 120 and the second electrode 130 from being short-circuited.

The elastic member 160 may include a porous polymer to have an elastic force. For example, the elastic member 160 may have the form of a foam body, such as a sponge. For example, the elastic member 160 may include thermoplastic elastomer, polystyrene, polyolefin, polyurethane thermoplastic elastomers, polyamides, synthetic rubbers, polydimethylsiloxane, polybutadiene, polyisobutylene, [poly(styrene-butadienestyrene)], polyurethanes, polychloroprene, polyethylene, silicone, and a combination thereof, but is not limited thereto.

Figure 3A:
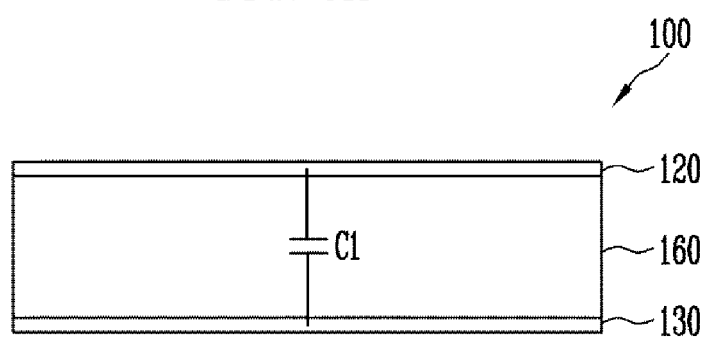
FIG. 3A and FIG. 3B are diagrams describing an operation of the pressure sensor illustrated in FIGS. 1 and 2.
Figure 3B:
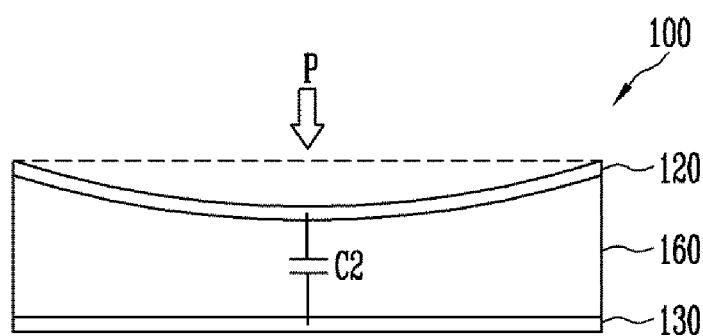

FIGS. 3A and 3B are diagrams for describing an operation of the first pressure sensor 100 illustrated in FIGS. 1 and 2. More particularly, FIG. 3A illustrates a state where a pressure P is not applied to the first pressure sensor 100, and FIG. 3B illustrates a state where the pressure P is applied to the first pressure sensor 100.

Referring to FIG. 3A, when the pressure P is not applied to the first pressure sensor 100, first capacitance C1 may be formed between the first electrode 120 and the second electrode 130.

Referring to FIG. 3B, when the pressure P is applied to the first pressure sensor 100 by a touch of a user and the like, a distance between the first electrode 120 and the second electrode 130 may be changed, and thus, the capacitance between the first electrode 120 and the second electrode 130 may be changed. For example, when a distance between the first electrode 120 and the second electrode 130 is changed by the applied pressure P, the first capacitance C1 may be changed to second capacitance C2.

When the external pressure P is increased, the capacitance of the first electrode 120 and the second electrode 130 may also be increased. Accordingly, an intensity of the pressure P may be detected by using a variation of the capacitance generated in the first pressure sensor 100. The pressure P applied to the first pressure sensor 100 may be generally caused by a touch of a user. However, the pressure P applied to the first pressure sensor 100 may be caused by other various reasons.

Figure 4:
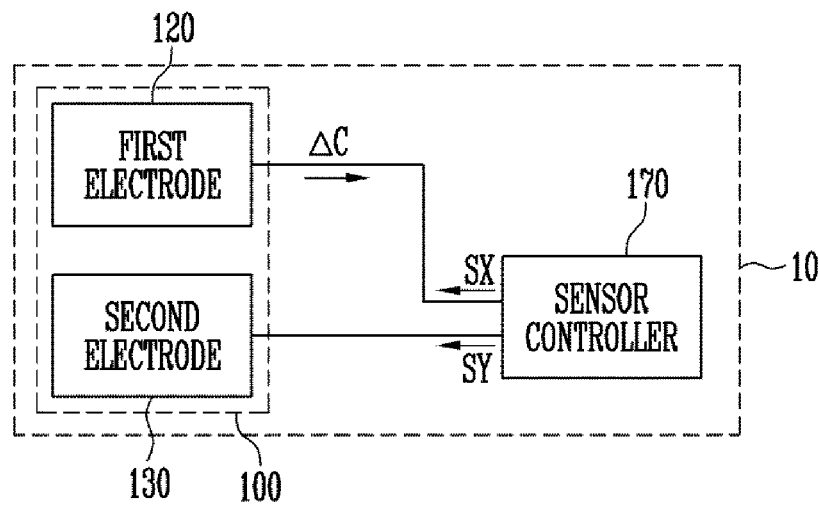
FIG. 4 is a diagram illustrating the input sensor including a controller according to an exemplary embodiment.

FIG. 4 is a diagram illustrating the input sensor including the sensor controller according to an exemplary embodiment. More particularly, in FIG. 4, the elastic member 160 is omitted for convenience of the description.

A sensor controller 170 may detect a pressure applied to the input sensor 10 by detecting a capacitance variation $\Delta C$ between the first electrode 120 and the second electrode 130. For example, the sensor controller 170 may detect the capacitance variation $\Delta C$ by using output signals of the first electrodes 120.

The sensor controller 170 may calculate an intensity of the touch based on the magnitude of the capacitance variation $\Delta C$. The sensor controller 170 may apply driving signals SX and SY to the first electrodes 120 and the second electrodes 130 to drive the first pressure sensor 100.

Figure 5A:
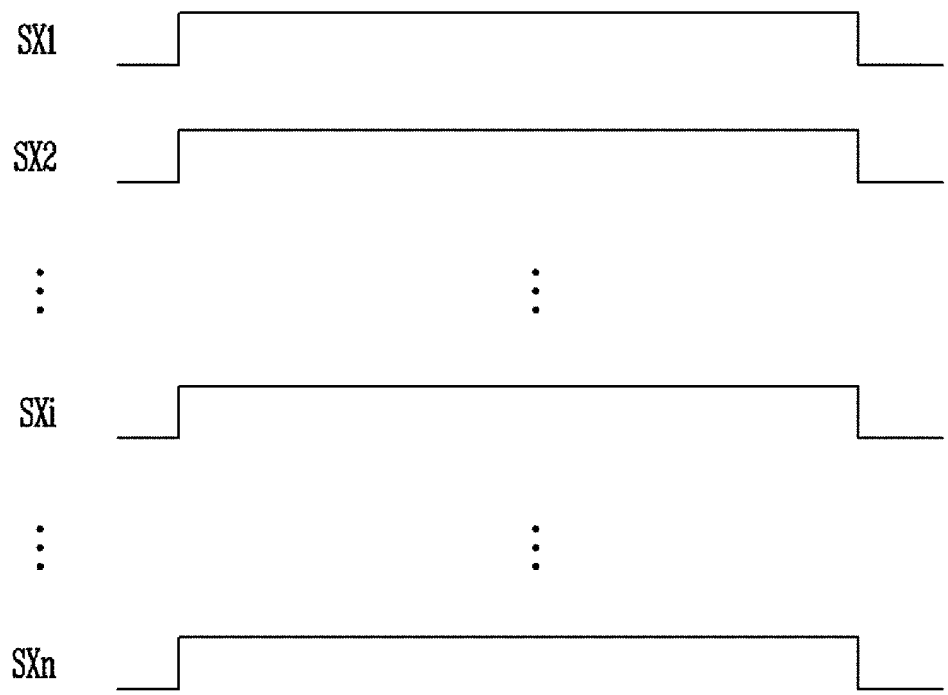
FIG. 5A is a diagram illustrating waveforms of driving signals applied to first electrodes.

FIG. 5A is a diagram illustrating waveforms of driving signals applied to the first electrodes, and FIG. 5B is a diagram illustrating waveforms of driving signals applied to the second electrodes.

Referring to FIG. 5A, the same driving signals SX1 to SXn may be supplied to the first electrodes 120. Referring to FIG. 5B, the driving signals SY1 to SYn may be sequentially supplied to the second electrodes 130, such that high levels of the driving signals SY1 to SYn supplied to the second electrodes 130 do not overlap each other. For example, after the driving signal SY1 is supplied to a first second electrode Y1, a second second electrode Y2 may be supplied with the driving signal SY2.

The first electrodes 120 and the second electrodes 130 according to an exemplary embodiment may be disposed in a matrix shape, such that the first electrodes 120 and the second electrodes 130 may also calculate a position of the touch, in addition to an intensity of the touch.

For example, when a detection signal corresponding to the capacitance variation $\Delta C$ is detected from the $i^{th}$ first electrode Xi (i is a natural number equal to or less than n), while the driving signal SYj is supplied to the $j^{th}$ second electrode Yj (j is a natural number equal to or less than m), it may be determined that the touch occurred at a position where the $i^{th}$ first electrode Xi and the $j^{th}$ second electrode Yj overlap.

Figure 6A:
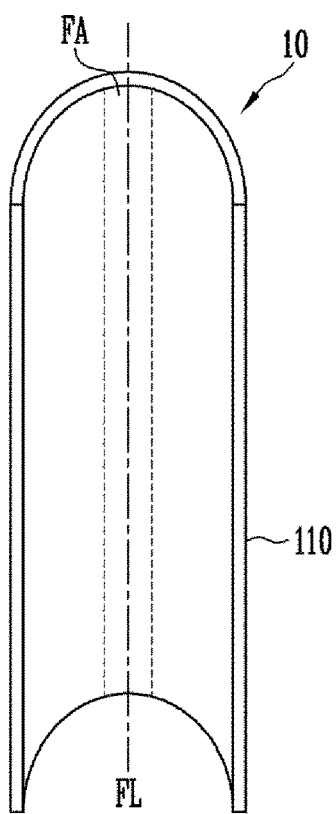
FIG. 6A and FIG. 6B are diagrams illustrating folded states of the pressure sensor according to an exemplary embodiment.
Figure 6B:
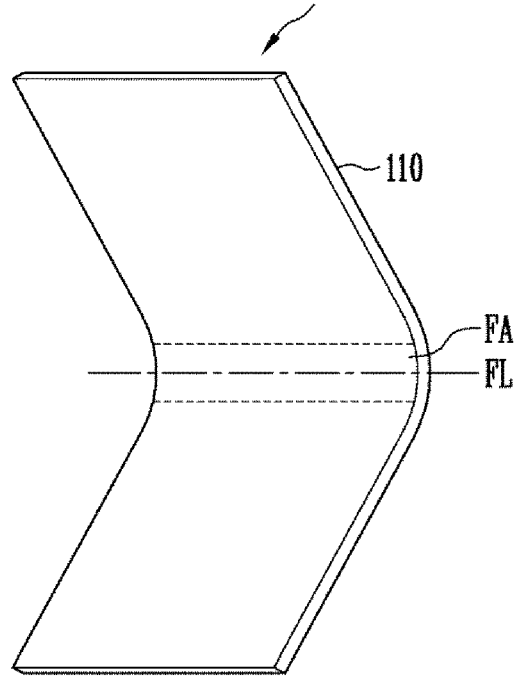

FIGS. 6A and 6B are diagrams illustrating when the input sensor according to an exemplary embodiment is folded. More particularly, FIG. 6A illustrates that the input sensor is folded along a vertical axis (Y-axis), and FIG. 6B illustrates that the input sensor is folded along a horizontal axis (X-axis). In FIGS. 6A and 6B, only the first pressure sensor 100 of the input sensor 10 is illustrated, for convenience of the description.

Referring to FIGS. 6A and 6B, the input sensor 10 according to an exemplary embodiment may be folded along a folding line FL. When the input sensor 10 is folded, a folding area FA may be formed based on the folding line FL. As used herein, the input sensor 10 being folded may mean that the substrate 110 of the input sensor 10 is folded, and may also mean that the display device is folded, which will be described in detail below.

When the input sensor 10 is folded along the folding line FL, the elastic member 160 of the first pressure sensor 100 disposed in the folding area FA may be transformed. More particularly, when the input sensor 10 is folded, the elastic member 160 disposed in the folding area FA may be applied with a compressive force or a tensile force. When the elastic member 160 is compressed, a distance between the first electrode 120 and the second electrode 130 may be decreased, and thus, capacitance between the first electrode 120 and the second electrode 130 may be changed. Further, when the elastic member 160 is elongated, a distance between the first electrode 120 and the second electrode 130 may be increased, and thus, capacitance between the first electrode 120 and the second electrode 130 may be changed.

However, when the detection signals reflecting the capacitance variation is output from the first pressure sensors disposed in the folding area FA, a sensor controller may determine that a touch has occurred in the folding area FA even if no touch has occurred. As such, the sensor controller may determine that a touch has occurred when the input sensor is folded.

According to an exemplary embodiment, the sensor controller 170 may control a portion of the first pressure sensor 100 from being driven when the input sensor 10 is folded. For example, the sensor controller 170 may control the first pressure sensor 100 such that a portion of the first pressure sensor 100 disposed in the folding area FA are not driven, and/or control the entire first pressure sensor 100 from being driven.

Figure 7A:
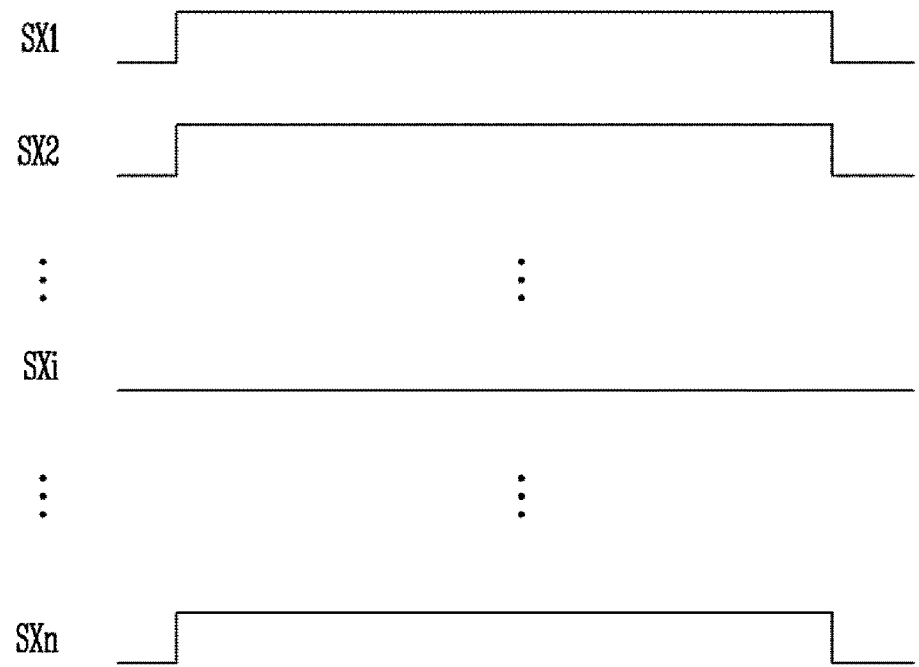
FIG. 7A is a diagram illustrating waveforms of driving signals applied to the pressure sensor when the input sensor illustrated in FIG. 6A is folded.

FIG. 7A is a diagram illustrating waveforms of driving signals applied to the pressure sensor when the input sensor according to an exemplary embodiment is folded as illustrated in FIG. 6A. In FIG. 7A, for convenience of the description, the $i^{th}$ first electrode Xi will be described as being disposed on the folding line FL.

The sensor controller 170 according to an exemplary embodiment may control the first pressure sensor 100 disposed in the folding area FA from being driven when the input sensor 10 is folded. More particularly, the sensor controller 170 may apply a driving signal SXi illustrated in FIG. 7A to the first pressure sensor 100 disposed in the folding area FA.

Figure 7B:
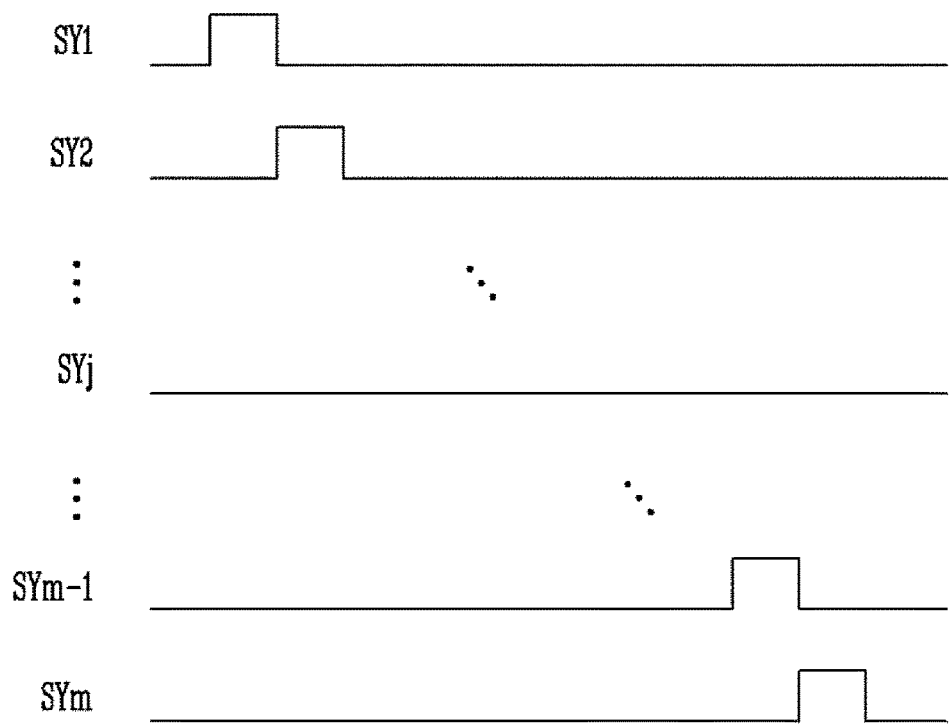
FIG. 7B is a diagram illustrating waveforms of driving signals applied to the pressure sensor when the input sensor illustrated in FIG. 6B is folded.

FIG. 7B is a diagram illustrating waveforms of driving signals applied to the pressure sensor when the input sensor according to an exemplary embodiment is folded as illustrated in FIG. 6B. In FIG. 7B, for convenience of the description, the $j^{th}$ second electrode Yi will be described as being disposed on the folding line FL.

The sensor controller 170 according to an exemplary embodiment may control the first pressure sensor 100 disposed in the folding area FA from being driven when the input sensor 10 is folded. More particularly, the sensor controller 170 may apply a driving signal SYj illustrated in FIG. 7B to the first pressure sensor 100 disposed in the folding area FA. In particular, the sensor controller 170 may control the first pressure sensor 100, such that a portion of the first pressure sensor 100 disposed in the folding area FA are not driven by not applying the driving signal to the first electrode 120 or the second electrode 130 disposed in the folding area FA.

According to an exemplary embodiment, when the input sensor 10 is folded, the sensor controller 170 may control the entire first pressure sensor 100 from being driven. In particular, the sensor controller 170 may not apply the driving signal to each of the first electrodes 120 and the second electrodes 130.

The sensor controller 170 according to an exemplary embodiment may determine whether the input sensor 10 is folded by using a detection signal output from the first pressure sensor 100.

When the input sensor 10 includes a predetermined folding line FL and a folding area FA, the sensor controller 170 may determine that the input sensor 10 is folded when the sensor controller 170 obtains a detection signal, to which the capacitance variation is reflected, from the first pressure sensor 100 disposed in the folding area FA.

In this case, when it is determined that the capacitance is not changed at any one of the crossing points between the first electrodes 120 and the second electrodes 130 disposed in the folding area FA, the sensor controller 170 may determine that the input sensor 10 is not folded.

When it is determined that the input sensor 10 is folded, the sensor controller 170 may control at least a part of the first pressure sensor 100 from being driven. More particularly, the sensor controller 170 may calculate a folding angle of the input sensor 10 from the capacitance variation, and control at least a part of the first pressure sensor 100 from being driven when the input sensor 10 is folded by a predetermined angle or greater.

Further, the sensor controller 170 may control at least a part of the first pressure sensor 100 from being driven when the input sensor 10 maintains a folded state for at least a predetermined time. Further, the sensor controller 170 may control at least a part of the first pressure sensor 100 from being be driven when the input sensor 10 maintains a folded state with a predetermined angle or greater for at least a predetermined time.

According to exemplary embodiment described above, the input sensor 10 is described as being folded along the predetermined folding line FL. However, the input sensor 10 may be folded in various forms by a manipulation of a user, and thus, the folding line FL may also be variously transformed in accordance with the form of the folded input sensor 10. In this case, the sensor controller 170 may determine the form (a position, an angle, the number of folding lines, and the like) of the folding line FL.

In general, the strength of power applied to the first pressure sensor 100 disposed in the folding area FA may be relatively greater when the input sensor 10 is folded, as compared to when a touch is input from the user. Accordingly, the sensor controller 170 may determine whether the input sensor is folded and the position of the folding line FL by referring to an output position of the detection signal corresponding to the capacitance variation having a predetermined value or more.

The input sensor 10 according to exemplary embodiments has been described as including the first pressure sensor 100, in which the capacitance thereof is changed when the distance between the first electrodes 120 and the second electrodes 130 is changed, but the present disclosure is not limited thereto. The input sensor 10 according to an exemplary embodiment may also include a first pressure sensor 100', in which the resistance thereof is changed when the distance between the first electrodes 121 and the second electrodes 131 is changed.

Figure 8:
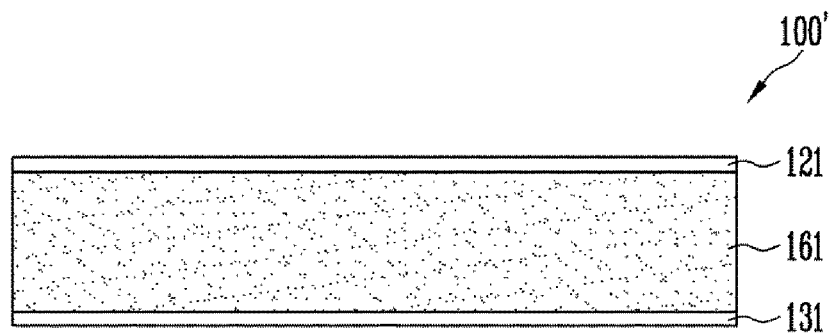
FIG. 8 is a cross-sectional view of a pressure sensor according to an exemplary embodiment.

FIG. 8 is a cross-sectional view of a pressure sensor according to an exemplary embodiment.

Referring to FIG. 8, a first pressure sensor 100' according to an exemplary embodiment may include a first electrode 121, a second electrode 131, and a variable resistance factor 161 disposed between the first electrode 121 and the second electrode 131.

The first electrode 121 includes a conductive material, such as metal or an alloy thereof. The metal may include gold (Au), silver (Ag), aluminum (Al), molybdenum (Mo), chrome (Cr), titanium (Ti), nickel (Ni), neodymium (Nd), copper (Cu), platinum (Pt), and the like.

According to an exemplary embodiment, the first electrode 121 may include a transparent conductive material, such as silver nano wire (AgNW), indium tin oxide (ITO), indium zinc oxide (IZO), antimony zinc oxide (AZO), indium tin zinc oxide (ITZO), zinc oxide (ZnC), tin oxide ($SnO_2$), a carbon nano tube, graphene, and the like.

The second electrode 131 is spaced apart from the first electrode 121, and may include a conductive material. The conductive material may be selected from the materials of the first electrode 121 described above, and the first and second electrodes 121 and 131 may include the same material or different materials.

The variable resistance factor 161 may be disposed between the first electrode 121 and the second electrode 131.

The first electrode 121 and the second electrode 131 may have the same shapes as those of the first electrode 120 and the second electrode 130 illustrated in FIG. 1. Further, the variable resistance factor 161 may be entirely formed between the first electrode 121 and the second electrode 131, or may be partially formed in crossing portions of the first electrodes 121 and the second electrodes 131.

The variable resistance factor 161 may have its electric characteristic changed according to a degree of transformation. More particularly, the variable resistance factor 161 may include a material in which resistance is changed according to the pressure from the outside between the first electrode 121 and the second electrode 131. For example, when power provided to the variable resistance factor 161 is increased, resistance of the variable resistance factor 161 may be decreased. In contrast, when power provided to the variable resistance factor 161 is increased, resistance of the variable resistance factor 161 may also be increased.

The variable resistance factor 161 may include a material, of which resistance thereof is changed according to pressure. For example, the variable resistance factor 161 may include materials referred to as a force sensitive material or force sensitive resistor. The variable resistance factor 161 may include at least one of a piezo-electric material, such as lead zirconate titanate (PZT) and polyvinylidene fluoride (PVDF), carbon powder, quantum tunnelling composite (QTC), silicon, a carbon nano tube, and graphene. Further, the variable resistance factor 161 may include nano particles. The nano particles may be provided in a form of a nano tube, a nano column, a nano rod, a nano hole, a nano wire, and the like.

The nano particles may also include particles of carbon, graphite, a metalloid, a metal, a conductive oxide of the metalloid or the metal, and a conductive nitride of the metalloid or the metal, or include particles in a core shell structure, in which the particles are coated on an insulating bead, or a combination thereof. The metalloid may include any one of antimony (Sb), germanium (Ge), and arsenic (As), or an alloy thereof. The metal may include a zinc (Zn), aluminum (Al), scandium (Sc), chrome (Cr), manganese (Mn), iron (Fe), cobalt (Co), nickel (Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), titanium (Ti), or an alloy thereof. The conductive oxide may include an indium tin oxide (ITO), an indium zinc oxide (IZO), an aluminum doped zinc oxide (AZO), a gallium indium zinc oxide (GIZO), a zinc oxide (ZnO), and a mixture thereof.

Figure 9A:
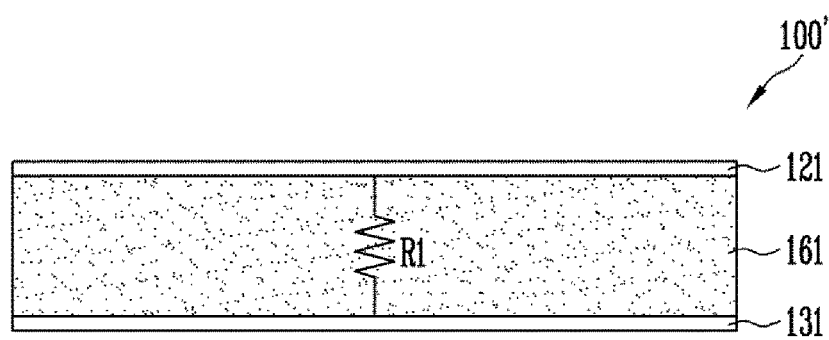
FIG. 9A and FIG. 9B are diagrams for describing an operation of a first pressure sensor 100' illustrated in FIG. 8.
Figure 9B:
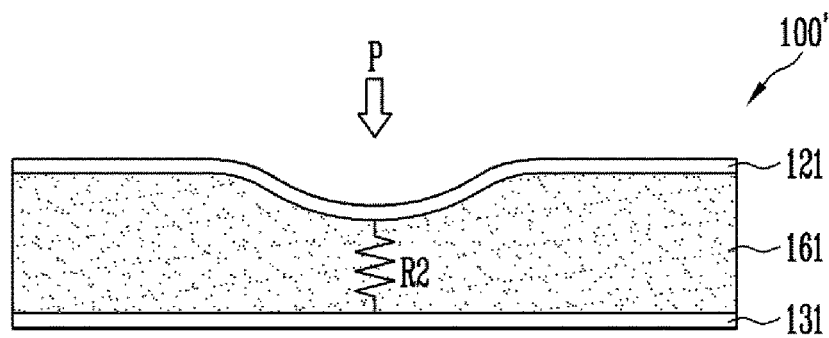

FIGS. 9A and 9B are diagrams for describing an operation of the first pressure sensor 100' illustrated in FIG. 8. More particularly, FIG. 9A illustrates a state where a pressure P is not applied to the first pressure sensor 100', and FIG. 9B illustrates a state where a pressure P is applied to the first pressure sensor 100'.

Referring to FIG. 9A, when the pressure P is not applied to the first pressure sensor 100', the first electrode 121 and the second electrode 131 are spaced apart from each other by a first distance with the variable resistance factor 161 interposed therebetween, and the variable resistance factor 161 may have first resistance R1.

Referring to FIG. 9B, when the pressure P is applied to the first pressure sensor 100' according to a touch of a user and the like, a distance between the first electrode 121 and the second electrode 131 may be changed, and thus, the form of the variable resistance factor 161 may be changed. In particular, resistance of the variable resistance factor 161 may be changed from the first resistance R1 to the second resistance R2. In this manner, the first pressure sensor 100' may detect an intensity of pressure by referring to the degree of change in the resistance.

Figure 10A:
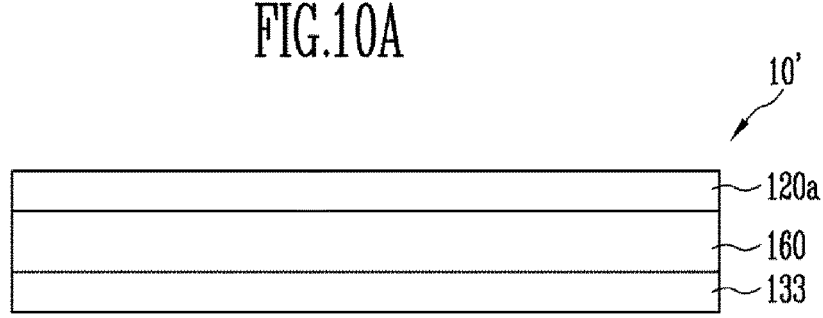
FIG. 10A and FIG. 10B are diagrams illustrating an input sensor according to an exemplary embodiment.
Figure 10B:
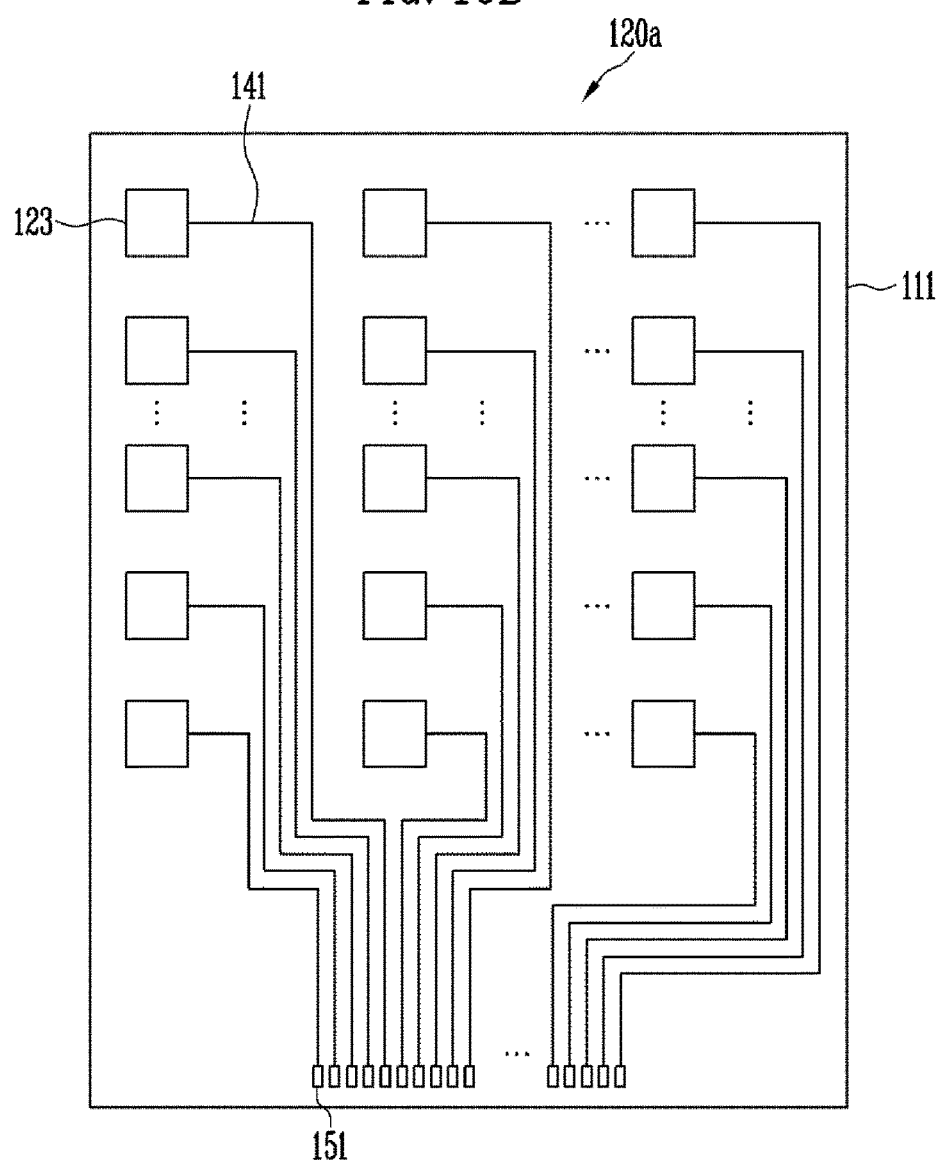

FIGS. 10A and 10B are diagrams illustrating an input sensor according to an exemplary embodiment.

Referring to FIGS. 10A and 10B, an input sensor 10' according to an exemplary embodiment may include a first electrode unit 120a, a second electrode 133, and an elastic member 160 disposed between the first electrode unit 120a and the second electrode 133.

The first electrode unit 120a may include a first substrate 111 and first electrodes 123 disposed on the substrate 111. The first electrodes 123 may include a conductive material, such as the materials of the first electrode 120 illustrated in FIGS. 1 and 2.

The first electrodes 123 may be sequentially arranged in a horizontal direction and a vertical direction. The substrate 111 may include an insulating material, such as glass and resin. Further, the substrate 111 may include a material having flexibility so as to be bendable or foldable, and may have a single-layer structure of a multi-layer structure. The substrate 111 may be selected from the materials of the substrate 110 illustrated in FIG. 1.

Wires 141 may be connected between the first electrodes 123 and pads 151. Further, the wires 141 may be connected with a sensor controller through the pads 151.

The second electrode 133 may be spaced apart from the first electrode unit 120a, and may include a conductive material. The conductive material may be selected from the materials of the first electrode 123, and the first and second electrodes 123 and 133 may include the same material or different materials from each other. The second electrode 133 may have a plate shape corresponding to the substrate 111 of the first electrode unit 120a.

The elastic member 160 may be disposed between the first electrode unit 120a and the second electrode 133. For example, one surface of the elastic member 160 may contact the first electrodes 123 of the first electrode unit 120a, and the other surface of the elastic member 160 may contact the second electrode 133. The elastic member 160 may perform the same function as that of the elastic member 160 of FIG. 2. Further, the elastic member 160 may be selected from the materials of the elastic member 160 of FIG. 2.

The first electrodes 123 and the second electrode 133 may form capacitors, and capacitance may be formed between the first electrodes 123 and the second electrode 133. The capacitance between the first electrodes 123 and the second electrode 133 may be varied according to a spaced distance between the first electrodes 123 and the second electrode 133.

For example, when a touch occurs in the input sensor 10', a distance between the first electrode 123 and the second electrode 133 that are disposed on the touched area may be changed, and thus, capacitance may be changed. Accordingly, the pressure of the touch may be detected by detecting the variation of capacitance from the touch.

FIGS. 10A and 10B illustrate that the first electrode unit 120a is disposed at an upper side of the second electrode 133. However, the first electrode unit 120a may also be disposed at a lower side of the second electrode 133. An operation process of detecting a touch by using the first electrodes 123, the second electrode 133, and the elastic member 160 is substantially the same as that described with reference to FIGS. 3A and 3B, and thus, repeated description thereof will be omitted.

FIGS. 10A and 10B illustrate that the elastic member 160 is disposed between the first electrode unit 120a and the second electrode 133, but the present disclosure is not limited thereto. For example, the variable resistance factor 161 illustrated in FIG. 8 may also be disposed between the first electrode unit 120a and the second electrode 133.

When the input sensor 10' includes the variable resistance factor 161, instead of the elastic member 160, the input sensor 10' may detect a touch through resistance variation between the first electrodes 123 and the second electrode 133. The touch detection operation process is substantially the same as that described with reference to FIGS. 8A and 8B, and thus, repeated description thereof will be omitted.

Figure 11A:
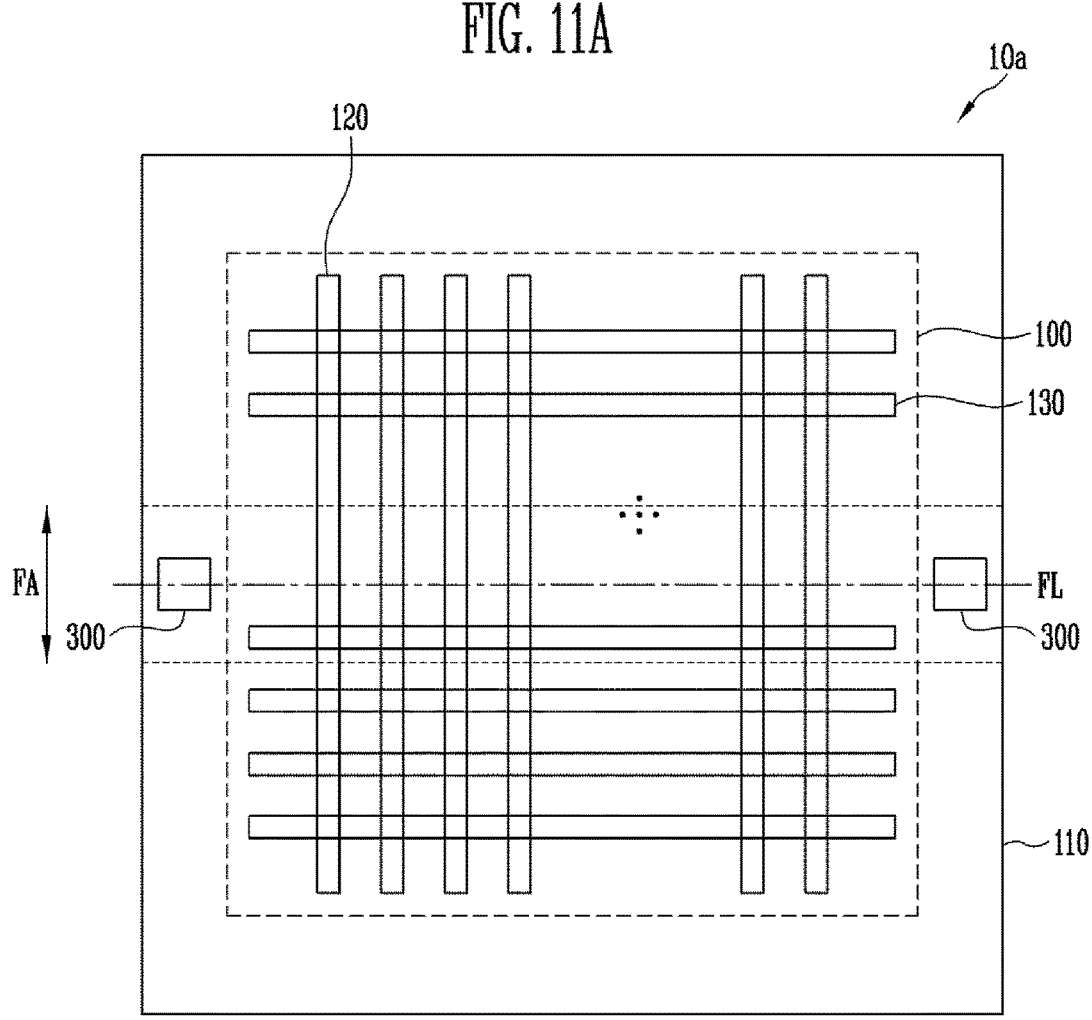
FIG. 11A and FIG. 11B are diagrams illustrating an input sensor according to an exemplary embodiment.
Figure 11B:
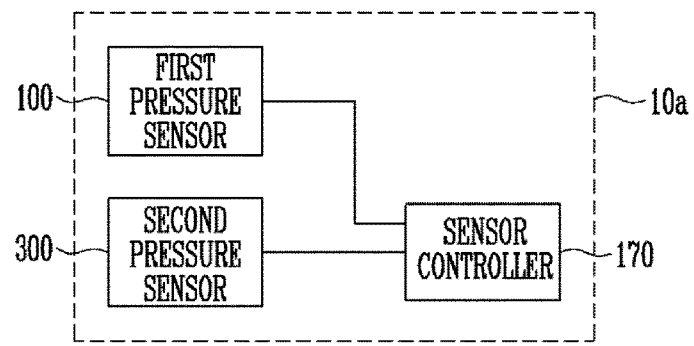

FIGS. 11A and 11B are diagrams illustrating an input sensor according to an exemplary embodiment. More particularly, FIG. 11A illustrates an input sensor having a predetermined folding line FL.

Referring to FIGS. 11A and 11B, an input sensor 10a according to an exemplary embodiment may include a substrate 110, and a first pressure sensor 100 and a second pressure sensor 300 disposed on the substrate 110. Further, the input sensor 10a may include a sensor controller 170, which obtains detection signals output from the first pressure sensor 100 and the second pressure sensor 300.

The substrate 110 and the first pressure sensor 100 may be substantially the same as those illustrated in FIG. 1. Alternatively, the substrate 110 and the first pressure sensor 100 may be substantially the same as those illustrated in FIGS. 10A and 10B. In FIG. 11A, the wires connected to the first pressure sensor 100 and the second pressure sensor 300, and the pads connected to the wires are omitted, for convenience of description.

Referring to FIG. 11A, the input sensor 10a according to an exemplary embodiment may be folded along the folding line FL. Further, the second pressure sensor 300 may be disposed around the first pressure sensor 100, and may be disposed on the folding line FL.

The second pressure sensor 300 may be substantially the same as the first pressure sensor 100 illustrated in FIG. 2. More particularly, the second pressure sensor 300 includes a first electrode 120, a second electrode 130 spaced apart from the first electrode 120 and forming capacitance with the first electrode 120, and an elastic member 160 disposed between the first electrode 120 and the second electrode 130. The second pressure sensor 300 may detect a pressure by using a capacitance variation corresponding to the transformation of the elastic member 160.

When the input sensor 10a is folded along the folding line FL, the second pressure sensor 300 disposed in the folding area FA may be transformed. More particularly, when the input sensor 10a is folded, the second pressure sensor 300 may be applied with a compressive force or a tensile force. That is, a distance between the first electrode 120 and the second electrode 130 of the second pressure sensor 300 may be changed, such that capacitance between the first electrode 120 and the second electrode 130 may be changed. In particular, the sensor controller 170 may determine whether the input sensor 10a is folded by using the detection signal output from the second pressure sensor 300.

The sensor controller 170 may control a part of the first pressure sensor 100 from being driven when the input sensor 10a is determined to be folded. For example, the sensor controller 170 may control the first pressure sensor 100 disposed in the folding area FA from being driven, and/or control the entire first pressure sensor 100 from being driven.

When a folding angle of the input sensor 10a is large, a capacitance variation of the second pressure sensor 300 may be increased. Accordingly, the sensor controller 170 may determine the folding angle of the input sensor 10a by using the detection signal obtained from the second pressure sensor 300.

When it is determined that the input sensor 10a is folded by a predetermined angle or greater, the sensor controller 170 may control a part of the first pressure sensor 100 from being driven. When it is determined that the input sensor 10a maintains a folded state for at least a predetermined time, the sensor controller 170 may also control at least a part of the first pressure sensor 100 from being driven. Further, the sensor controller 170 may control at least a part of the first pressure sensor 100 from being driven when the input sensor 10a maintains a folded state with a predetermined angle or greater for at least a predetermined time.

The second pressure sensor 300 may detect an unfolded state of the input sensor 10a, and the folded state of the input sensor 10a. For example, when the folded input sensor 10a is unfolded, the compressed second pressure sensor 300 may be elongated back to an original state. Alternatively, when the folded input sensor 10a is unfolded, the elongated second pressure sensor 300 may be compressed back to an original state.

When the sensor controller 170 determines that the folded input sensor 10a is unfolded, the sensor controller 170 may drive the first pressure sensor that was controlled from being driven. For example, when an angle of the folded input sensor 10a is less than a predetermined angle, the sensor controller 170 may drive the first pressure sensor that was controlled from being driven.

According to an exemplary embodiment, the second pressure sensor 300 may also be substantially the same as the first pressure sensor 100' illustrated in FIG. 8. More particularly, the second pressure sensor 300 includes a first electrode 121, a second electrode 131 spaced apart from the first electrode 121, and a variable resistance factor 161 disposed between the first electrode 121 and the second electrode 131. The second pressure sensor 300 may detect pressure by using a resistance variation corresponding to a transformation of the variable resistance factor 161.

Figure 12:
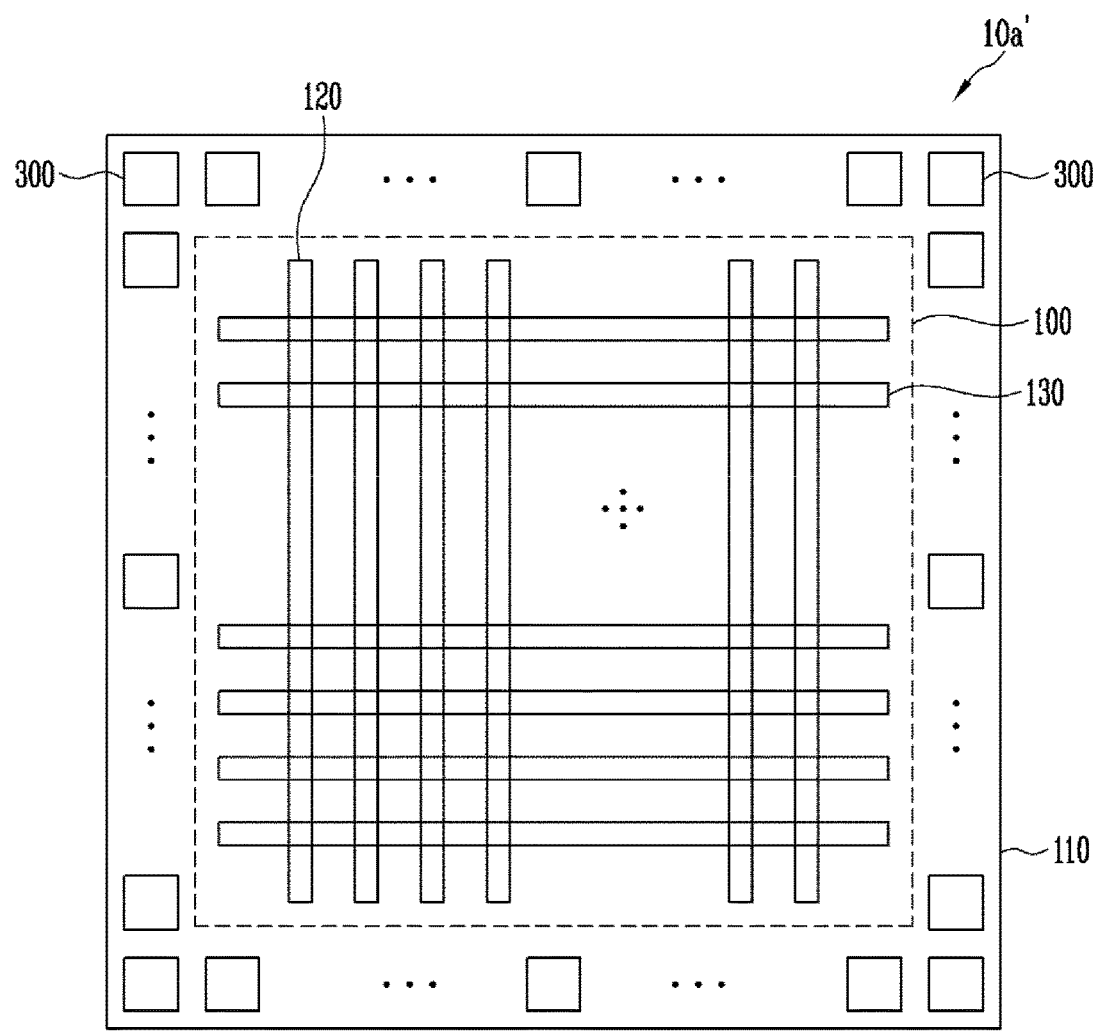
FIG. 12 is a top plan view illustrating an input sensor according to an exemplary embodiment.

FIG. 12 is a top plan view illustrating an input sensor according to an exemplary embodiment. More particularly, FIG. 12 illustrates an input sensor 10a', in which a folding line and a folding area may be randomly changed by a manipulation of a user.

Referring to FIG. 12, an input sensor 10' according to an exemplary embodiment may include a substrate 110, a first pressure sensor 100, and a second pressure sensor 300 disposed on the substrate 110.

The substrate 110 and the first pressure sensor 100 may be substantially the same as those illustrated in FIG. 11a. In FIG. 12, illustration of the wires connected to the first pressure sensor 100 and the second pressure sensor 300, and pads and a sensor controller connected to the wires are omitted, for convenience of description.

Referring to FIG. 12, the second pressure sensors 300 may be disposed around the first pressure sensor 100, and may be arranged along a border of the substrate 110. The second pressure sensors 300 may be substantially the same as the second pressure sensor 300 illustrated in FIG. 11a, and thus, repeated description thereof will be omitted.

When the input sensor 10a' is folded, some of the second pressure sensors 300 may be transformed. In particular, a sensor controller 170 may determine whether the input sensor 10a is folded by using the detection signal output from the second pressure sensor 300.

Further, the sensor controller 170 may obtain a position of the transformed second pressure sensor 300, and may determine a folding line and a folding area of the input sensor 10a' based on the position of the transformed second pressure sensor 300. For example, when the input sensor 10a' is folded, the second pressure sensors 300 disposed on two different sides of the substrate 110 to face other are transformed, and an area including lines connecting the transformed second pressure sensors 300 may be determined as a folding area FA.

When it is determined that the input sensor 10a' is folded, the sensor controller 170 may control a part of the first pressure sensor 100 from being driven. For example, the sensor controller 170 may control the first pressure sensor 100 disposed in the folding area FA from being driven, and/or control the entire first pressure sensor 100 from being driven. The process of controlling driving of the first pressure sensor 100 based on whether the input sensor 10a' is folded is substantially the same as that described above, and thus, repeated description thereof will be omitted.

Figure 13:
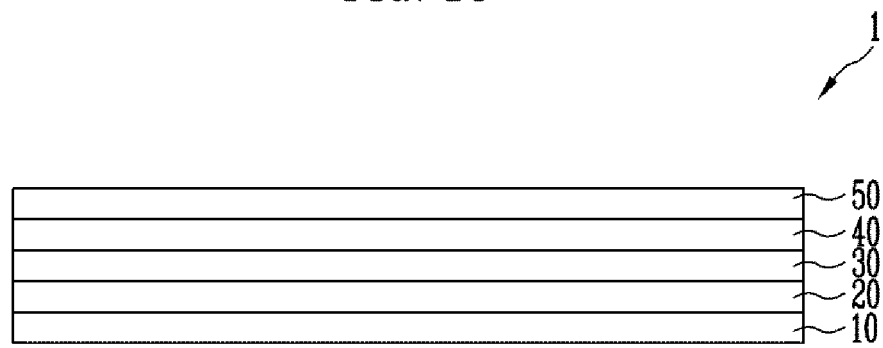
FIG. 13 is a cross-sectional view illustrating a display device according to an exemplary embodiment.

FIG. 13 is a cross-sectional view illustrating a display device according to an exemplary embodiment.

Referring to FIG. 13, a display device 1 according to an exemplary embodiment may include an input sensor 10, a display panel 20, and a window 50.

The input sensor 10 may calculate a position and an intensity of touch input to the display device 1. Further, the input sensor 10 may detect whether the display device 1 is folded, and control at least a part of a first pressure sensor included in the input sensor 10 from being driven when the display device is folded.

The input sensor 10 may be implemented as the input sensor 10 described with reference to FIGS. 1 to 9B, and the same element is denoted with the same reference numeral, and thus, repeated description of the input sensor 10 will be omitted.

The display panel 20 may display an image, and may be disposed on the input sensor 10. A polarizing plate 30 may be disposed at a lower side of the window 50, and an attachment member 40 may be disposed between the window 50 and the polarizing plate 30. The polarizing plate 30 may be omitted as necessary.

The adhesive member 400 may be implemented with an optically transparent adhesive, resins, tape, and the like. Although not illustrated in FIG. 13, the display device 1 according to an exemplary embodiment may further include a bracket, which accommodates the input sensor 10, the display panel 20, and the polarizing plate 30, and is coupled with the window 50.

In FIG. 13, the input sensor 10 is described as one of the input sensor 10 described with reference to FIGS. 1 to 9B, but the present disclosure is not limited thereto. More particularly, according to an exemplary embodiment, the input sensor 10 in the display device 1 may be implemented with the input sensor 10' described with reference to FIGS. 10A and 10B. Further, according to an exemplary embodiment, the input sensor 10 in the display device 1 may be implemented with the input sensor 10a described with reference to FIGS. 11A and 11B and the input sensor 10' described with reference to FIG. 12.

FIG. 13 illustrates that the input sensor 10 is disposed at the lower side of the display panel 20, but the present disclosure is not limited thereto, and the input sensor 10 may also be positioned on the display panel 20. The input sensor 10 may be disposed on or beneath the display panel 20 after being separately formed form the display panel 20. Alternatively, the input sensor 10 may be integrally formed with the display panel 20 inside the display panel 20.

The display device 1 according to an exemplary embodiment may be folded (in-folding) so that the window 50 faces an external side and the display panel 20 faces an internal side. Alternatively, the display device 1 may be folded (out-folding) so that the display panel 20 faces an external side and the window 50 faces an internal side.

Figure 14:
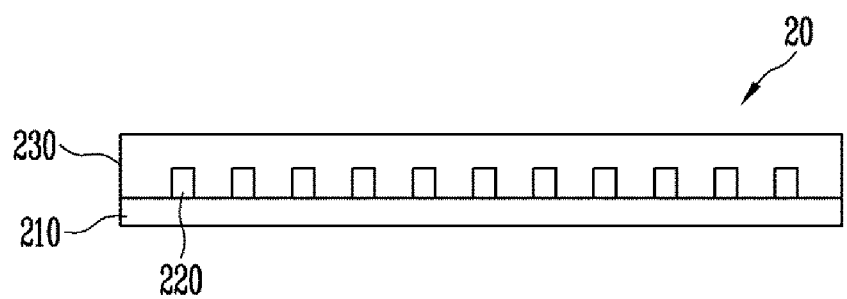
FIG. 14 is a diagram illustrating a display panel illustrated in FIG. 13.

FIG. 14 is a diagram illustrating the display panel illustrated in FIG. 13.

Referring to FIG. 14, the display panel 20 according to an exemplary embodiment may include a substrate 210, pixels 220, and an encapsulation layer 230. A plurality of pixels 220 may be disposed on the substrate 210, and the encapsulation layer 230 may be disposed on the pixels 220 and the substrate 210. The substrate 210 may include an insulating material, such as glass and resin. Further, the substrate 210 may include a material having flexibility so as to be bendable or foldable, and may have a single-layer structure of a multi-layer structure.

For example, the substrate 210 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material of the substrate 210 may be variously changed, and may be formed of fiber glass reinforced plastic (FRP), and the like.

The pixels 220 may emit light under the control of a display driver (not illustrated), and may be protected by the encapsulation layer 230. For example, the encapsulation layer 230 may prevent moisture, oxygen, and the like from permeating into the pixels 220. In this case, the encapsulation layer 230 may include at least one of glass, an organic material, and an inorganic material, and may have a single structure of a multi-layer structure. For example, the encapsulation layer 230 may have a multi-layer structure including one or more organic layers and one or more inorganic layers.

A material of the organic layer may be a fluoride-based carbon compound, such as polyacryl, polyimide, and Teflon, and an organic insulating material, such as poly epoxy and benzocyclobutene. A material of the inorganic material may include polysiloxane, a silicon nitride, a silicon oxide, and an inorganic insulating material including an aluminum oxide.

Figure 15:
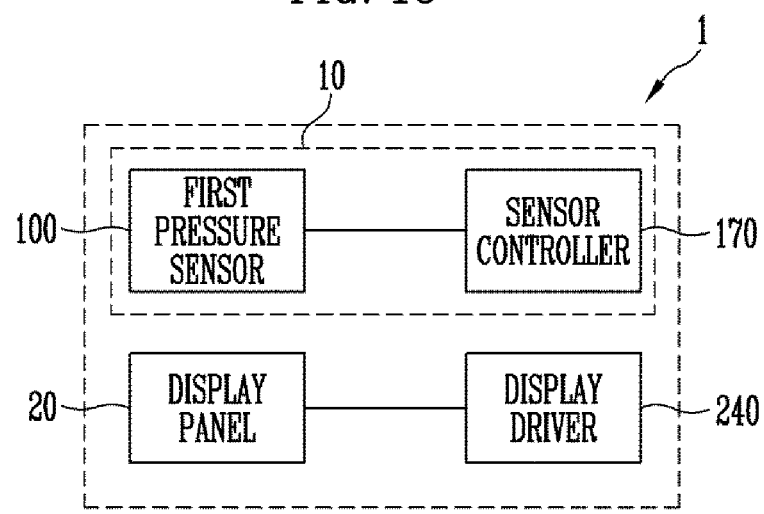
FIG. 15 is a diagram illustrating a display device including a display driver according to an exemplary embodiment.

FIG. 15 is a diagram illustrating a display device including a display driver according to an exemplary embodiment.

Referring to FIG. 15, the display device 1 according to an exemplary embodiment may further include a display driver 240. The display driver 240 may control an image display operation of the display panel 20 by supplying an image driving signal to the display panel 20. As such, the display driver 240 may generate an image driving signal by using image data and a control signal provided from the outside.

For example, the display driver 240 may receive image data and a control signal from a host (not illustrated). The control signal may include a vertical synchronization signal, a horizontal synchronization signal, a main clock signal, and the like. Further, the image driving signal may include a scan signal, a data signal generated by using image data DATA, and the like.

A sensor controller 170 may calculate a position and an intensity of pressure applied to the display device 1 by using a detection signal obtained from a first pressure sensor 100. Further, the sensor controller 170 may determine whether the display device 1 is folded, and may control at least a part of the first pressure sensor 100 from being driven when it is determined that the display device 1 is folded.

Further, the sensor controller 170 may transmit a signal containing a position and an intensity of the pressure applied to the display device 1, a signal containing information indicating whether the display device 1 is folded, and a signal containing information about a folding line and a folding area to the display driver 240.

The display driver 240 may control an image display operation of the display panel 20, such that a user interface (UI) corresponding to the position and the intensity is executed and displayed by referring to the information with respect to the position and the intensity of pressure applied to the display device 1.

For example, when a touch is made on an icon displayed in the display device 1, an input sensor 10 may detect a pressure corresponding to the touch, and the icon may be executed and displayed through the display panel 20.

When the display device 1 is folded, the first pressure sensor 100 disposed in the folding area may not be driven. For example, even when the display device 1 is folded and the first pressure sensor 100 is transformed, the sensor controller 170 may not obtain a detection signal from the first pressure sensor 100 disposed in the folding area, to which a capacitance variation is not reflected. Accordingly, in the folding area, an image that is different from the one that would be displayed when an icon is executed may be displayed on the display panel 20.

According to exemplary embodiments, the display device 1 may be prevented from recognizing the transformation of the first pressure sensors 100 disposed in the folding area as an occurrence of a touch in the folding area, when then display device 1 is folded, thereby preventing the execution of the user interface displayed on the folding area.

In addition, according to exemplary embodiments, while each of the first pressure sensors 100 may be driven when the display device 1 is folded, however, the display device 1 may prevent the user interface from being executed by detection signals obtained from the first pressure sensors that are disposed in a folding area. Alternatively, each user interface may not be executed when the display device 1 is folded. That is, when a display driver 240 receives a signal indicating that the display device 1 is folded, the display driver 240 may control an image, such that a display panel 20 may not display an image that would be displayed when a user interface is executed.

In exemplary embodiments, the display driver 240 may control the UI from being executed only when the display device 1 is folded by a predetermined angle or greater. Further, the display driver 240 may control the UI from being executed, only when the display device maintains a folded state for at least a predetermined time. Further, the display driver 240 may control the UI from being executed, only when the display device maintains a folded state by a predetermined angle or greater for at least a predetermined time.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. An input sensor, comprising:
    a substrate including a first area, a second area, and a folding area disposed between the first and second areas;
    a first pressure sensor disposed on the substrate; and
    a sensor controller configured to apply a driving signal to the first pressure sensor, and calculate a position and an intensity of a touch by using a first detection signal obtained from the first pressure sensor in response to the driving signal,
    wherein the sensor controller is configured to not apply the driving signal only to a portion of the first pressure sensor disposed in the folding area, and to apply the driving signal to a remaining portion of the first pressure sensor disposed in the first and second areas, when it is determined that the substrate is folded by at least a first predetermined angle.

2. The input sensor of claim 1, further comprising a second pressure sensor disposed on the substrate around the first pressure sensor, and configured to detect a pressure applied to the substrate when the substrate is folded.

3. The input sensor of claim 2, wherein the sensor controller is configured to determine a folding angle of the substrate by using a second detection signal obtained from the second pressure sensor.

4. The input sensor of claim 2, wherein the second pressure sensor is configured to detect a pressure applied to the substrate when the folded substrate is unfolded.

5. The input sensor of claim 4, wherein the sensor controller is configured to apply the driving signal to the entire first pressure sensor when the folded substrate is unfolded.

6. The input sensor of claim 1, wherein the sensor controller is configured to not apply the driving signal to at least a portion of the first pressure sensor when it is determined that the substrate maintains a folded state for at least a first time period.

7. The input sensor of claim 1, wherein the sensor controller is configured to determine whether the substrate is folded by using the first detection signal obtained from the first pressure sensor.

8. A display device, comprising:
    an input sensor comprising:
        a substrate;
        a first pressure sensor disposed on the substrate and configured to detect a pressure input to the display device; and
        a sensor controller configured to apply a driving signal to the first pressure sensor and calculate a position and an intensity of the pressure by using a first detection signal obtained from the first pressure sensor in response to the driving signal; and a display panel disposed on one surface of the input sensor, and configured to display an image of an executed user interface corresponding to the position and the intensity of the input pressure, the display panel including a first area, a second area, and a folding area disposed between the first and second areas,
    wherein the sensor controller is configured to not apply the driving signal to only a portion of the first pressure sensor disposed in the folding area, and to apply the driving signal to a remaining portion of the first pressure sensor disposed in the first and second areas, when it is determined that the substrate is folded by at least a first predetermined angle.

9. The display device of claim 8, further comprising:
    second pressure sensors disposed on the substrate around the first pressure sensor, and
    configured to detect a pressure applied to the display device when the display device is folded.

10. The display device of claim 9, wherein the sensor controller is configured to determine a folding angle of the display device by using a second detection signal obtained from the second pressure sensors.

11. The display device of claim 9, wherein the sensor controller is configured to not apply the driving signal to at least the portion of the first pressure sensor when it is determined that the display device maintains a folded state for at least a first time period.

12. The display device of claim 9, wherein the second pressure sensors are configured to detect a pressure applied to the display device when the folded display device is unfolded.

13. The display device of claim 12, wherein the sensor controller is configured to apply the driving signal to the entire first pressure sensor when the folded display device is unfolded.

14. The display device of claim 8, wherein the sensor controller is configured to apply the driving signal to the entire first pressure sensor, when the display device is folded such that the user interface is not executed.

15. The display device of claim 8, wherein the display panel is configured to not display an image of the user interface corresponding to the first detection signal obtained from the first pressure sensor disposed in a folding area when the display device is folded.

* * * * *